H. R. FISHER.
ROTARY STEAM MOTOR.
APPLICATION FILED APR. 20, 1908.

934,803.

Patented Sept. 21, 1909.

5 SHEETS—SHEET 1.

Witnesses:
Helen V. Reap.
R. C. Taylor.

Inventor:
Henry R. Fisher.
By
F. J. Larsen &Co.
Attorneys.

H. R. FISHER.
ROTARY STEAM MOTOR.
APPLICATION FILED APR. 20, 1908.

934,803.

Patented Sept. 21, 1909.
5 SHEETS—SHEET 2.

Witnesses:
C. J. Crenshaw.
Helen V. Reap.

Inventor:
Henry R. Fisher.
By
F. J. Rawson & Co.
Attorneys.

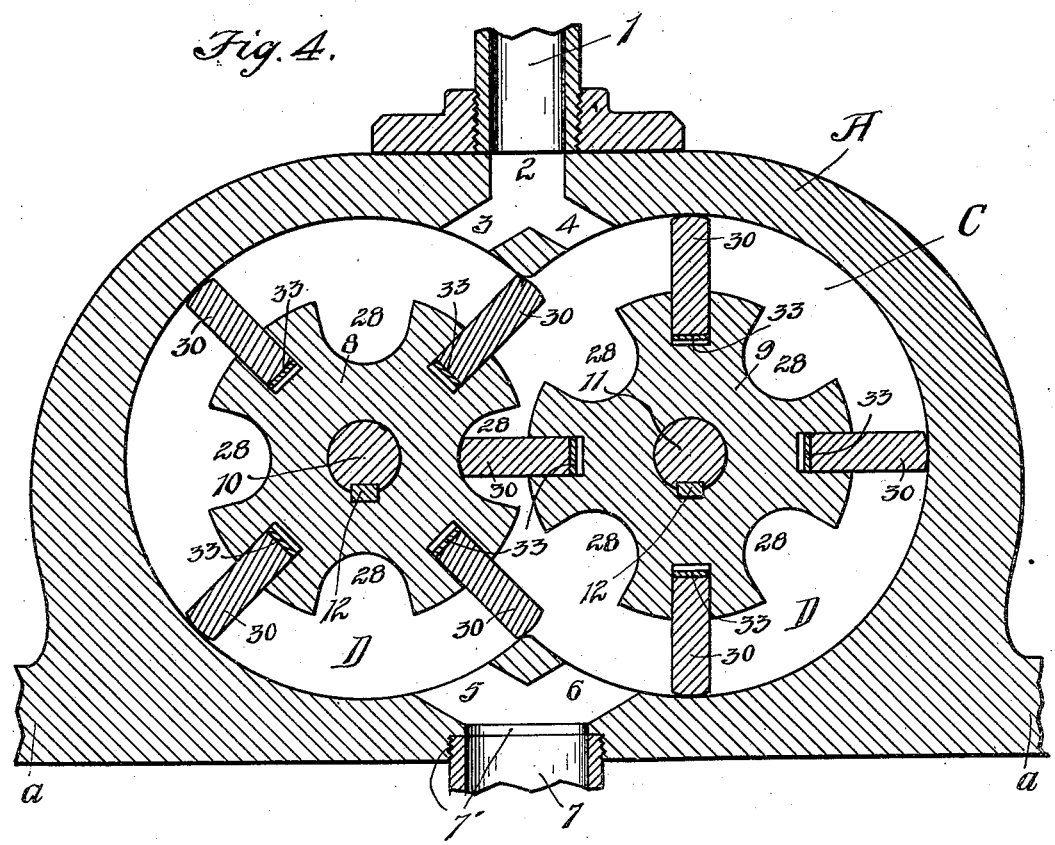
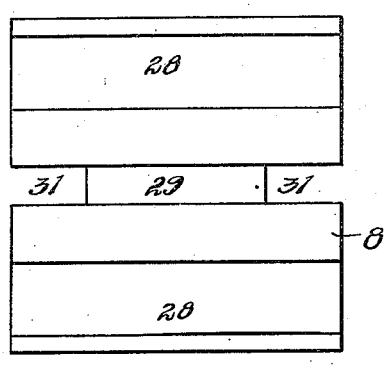
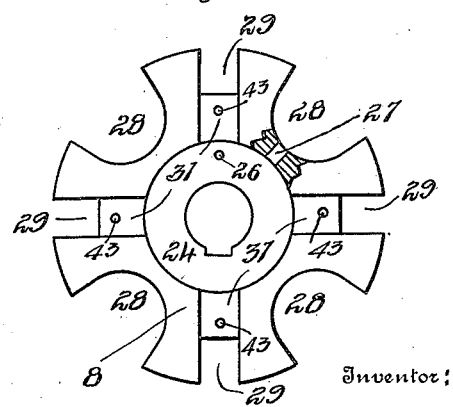

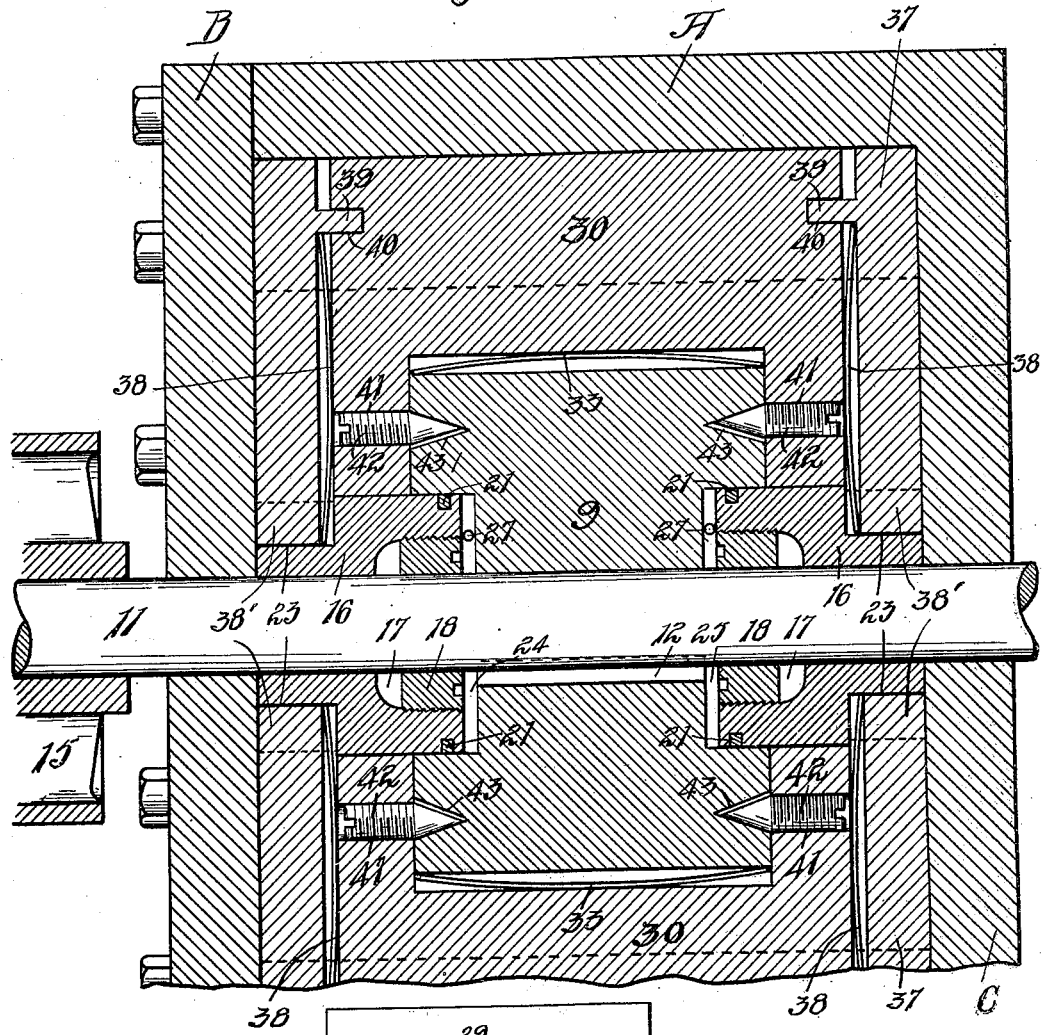

H. R. FISHER.
ROTARY STEAM MOTOR.
APPLICATION FILED APR. 20, 1908.

934,803.

Patented Sept. 21, 1909.
5 SHEETS—SHEET 5.

Witnesses:
Helen V. Reap.
R. C. Taylor

Inventor:
Henry R. Fisher
By F. J. Larson & Co.
Attorneys.

UNITED STATES PATENT OFFICE.

HENRY R. FISHER, OF UNDERWOOD, IOWA.

ROTARY STEAM-MOTOR.

934,803.

Specification of Letters Patent. Patented Sept. 21, 1909.

Application filed April 20, 1908. Serial No. 428,121.

*To all whom it may concern:*

Be it known that I, HENRY R. FISHER, a citizen of the United States, residing at Underwood, in the county of Pottawattamie and State of Iowa, have invented a new and useful Rotary Steam-Motor, of which the following is a specification.

Figure 1:
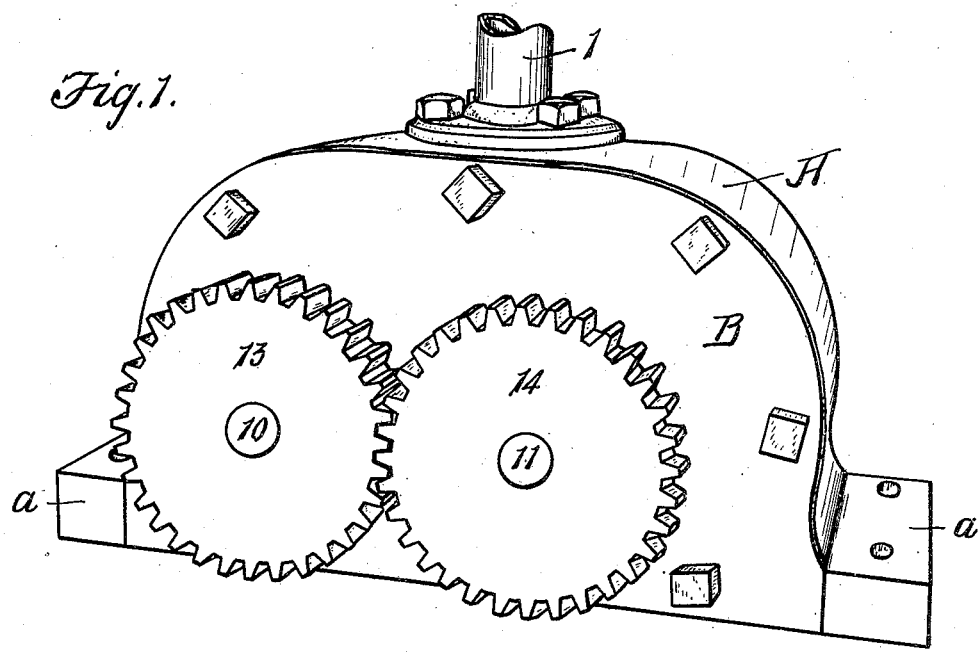
Figure 2:
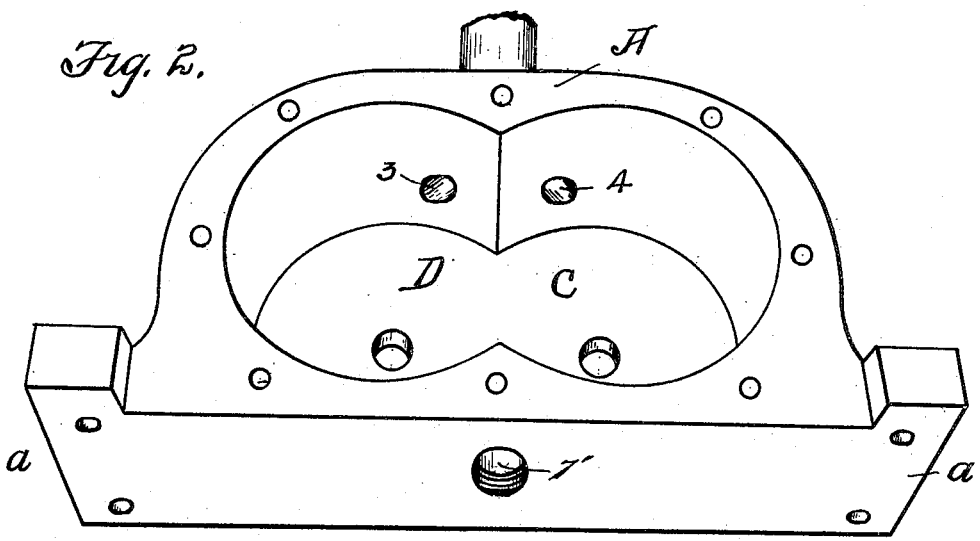
Figure 3:
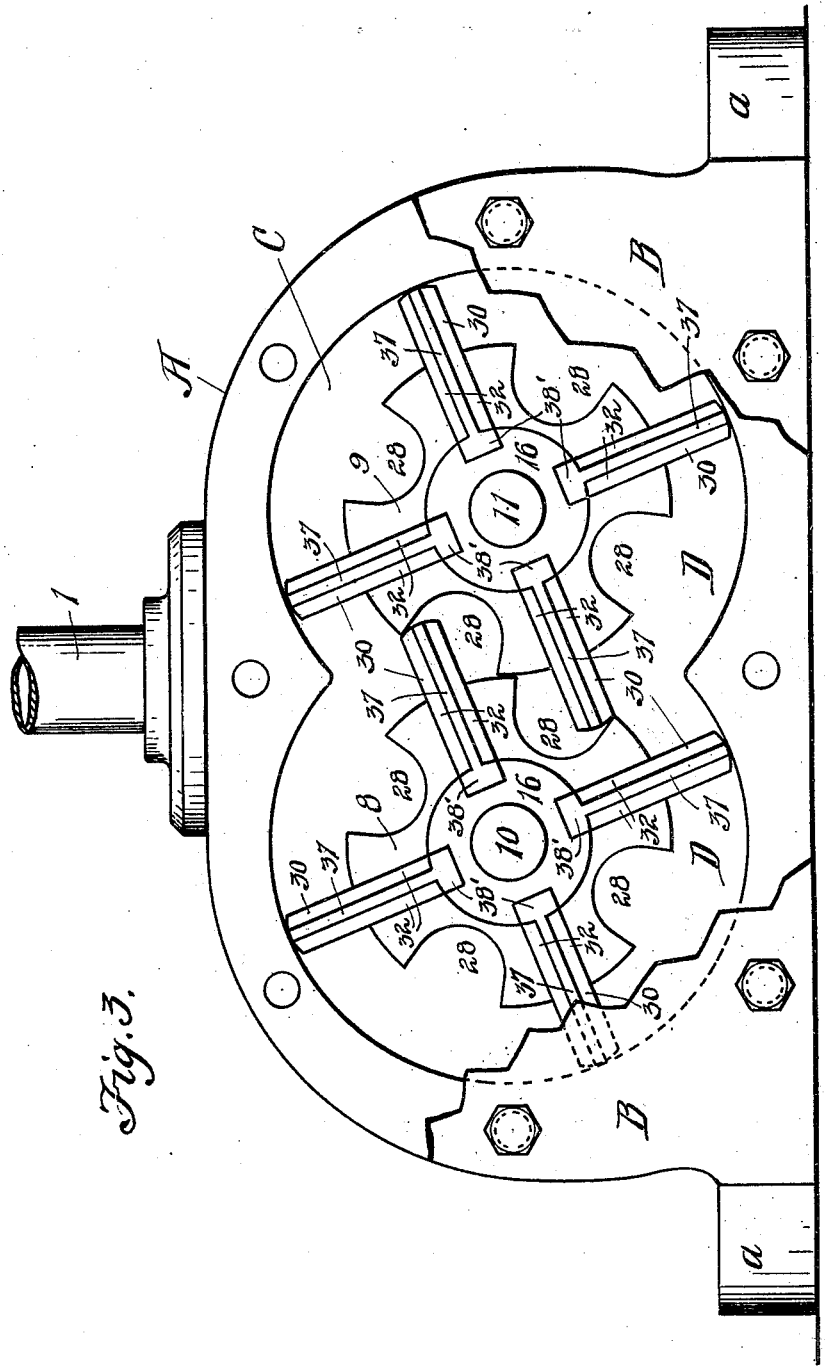
Figure 9:
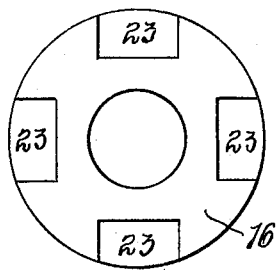
Figure 10:
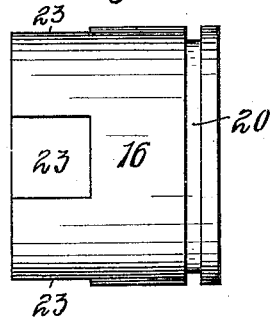
Figure 12:
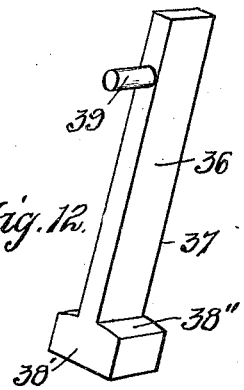
Figure 11:
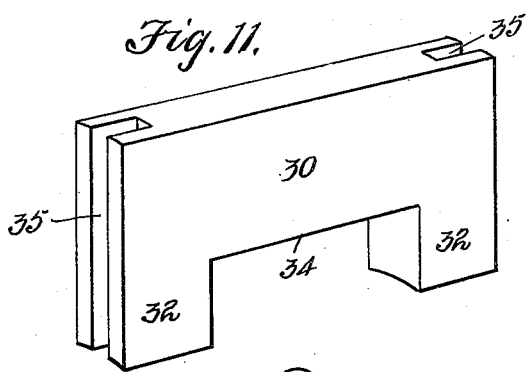
Figure 13:
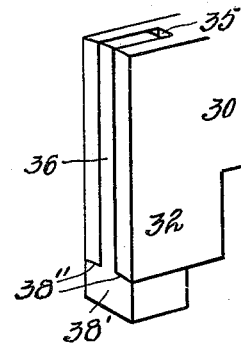
Figure 14:
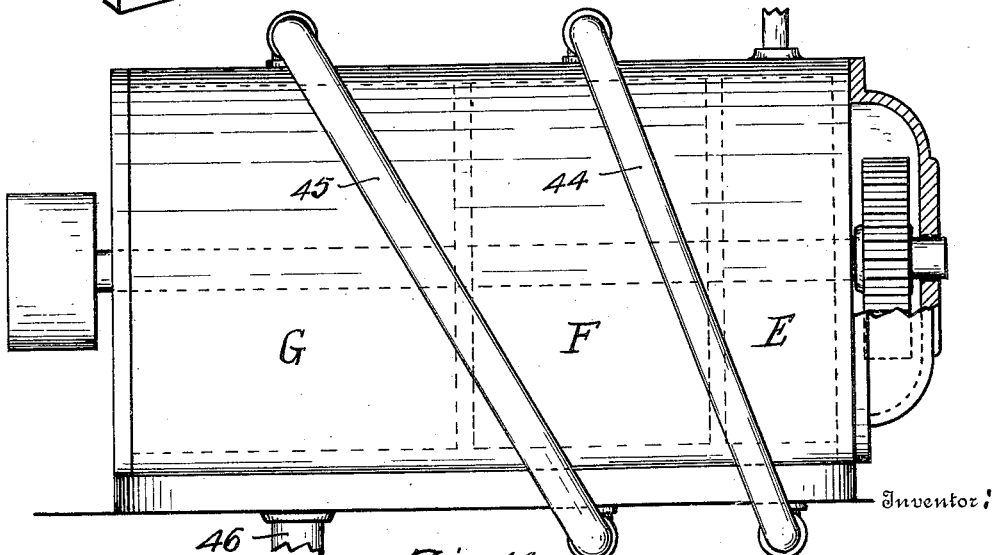

My invention relates to a rotary motor designed to be driven by means of steam adapted, when confined in a chamber, to exert a pressure upon parts moving in opposite directions, and it has for its object mainly, the production of a rotary motor to be run with such kind of power.
Further objects of the invention are simplicity of construction, durability as to wear, continuous packing, etc., and to this purpose the invention consists in certain parts and combination of parts and mechanism, as hereinafter explained producing a rotary motor or engine specially adapted to work with steam and adaptable for automobiles, marines, traction engines and the like where speed is required.
Referring to the accompanying drawings forming a part of this specification, wherein like characters of reference denote similar parts throughout the several views: Figure 1, is a perspective view of my improved steam motor. Fig. 2, is a perspective view of the casing or cylinder. Fig. 3, is an elevation with the removable head partly broken away the interior of the cylinder case and end view of parts working therein. Fig. 4, is an elevation in longitudinal section through the motor or engine cylinder and parts working therein. Fig. 5, is a side elevation of one of the pistons. Fig. 6, is an end elevation thereof. Fig. 7, is an enlarged central vertical section of the motor through one of the piston heads and parts showing the lower part thereof broken away. Fig. 8, is a longitudinal section of one of the pistons. Fig. 9, is an end elevation of one of the cushion plugs. Fig. 10, is a side elevation thereof. Fig. 11, is a perspective view of one of the adjustable blades. Fig. 12, is a perspective view of one of the side packing elements located in each end of the blades. Fig. 13, is a perspective view of one end of one of the piston blades with one of the side packing elements in position. Fig. 14, is an elevation of a compound motor which is a modification of the single motor.

Referring to the drawings in Figs. 1 to 4, the reference character A, designates the cylinder case or body of the motor having the projecting ends for forming a base *a*, provided with openings for the reception of bolts or the like for rigidly securing same in position. The reference characters B and C, designate the front and back heads of the cylinder, the head B, being removable and held rigidly in place by means of lag screws, while head C, is preferably integral with the cylinder A.

The interior of the cylinder A, which will be known hereinafter as the steam or expansive chamber D, is peculiar in form resembling that of a figure eight. Connecting the steam or expansive chamber D, with the steam supply pipe 1, is the main port 2, branching at its lower end into two port openings 3 and 4, one leading to one side of the central line of the steam or expansive chamber and the other to the other side thereof as clearly shown in Fig. 4. The lower side or bottom of the cylinder A, is provided with the inclined exhaust port openings 5 and 6, which lead to the exhaust pipe 7, which has threaded engagement with opening 7'.

Rotatably held within the steam or expansion chamber D, are a pair of pistons 8 and 9, which are mounted upon the shafts 10 and 11 and keyed thereto as at 12. These shafts 10 and 11 pass through the heads B and C and are provided at one end with the gears 13 and 14 which mesh with one another as clearly shown in Fig. 1. One of the shafts, as clearly shown in Fig. 7, is provided at the opposite end of the gears with a pulley wheel 15 and is used as a power shaft for transmitting the power by means of a belt or the like for propelling or pulling purposes.

Surrounding the shafts 10 and 11 at opposite ends of the cylindrical heads 8 and 9 are the cushions or packing plugs 16. The space designated 17 is filled with suitable packing (not shown) to prevent the leakage of steam from around the shafts. The periphery of the head of these packing plugs are provided with an annular groove 20, (see Fig. 10) for the reception of a packing ring 21, as clearly shown in Fig. 7. The periphery of the packing plugs are, at their opposite or outer ends provided with a plurality of recesses or cutaway portions 23, preferably four, for the reception of the lower ends or heads 38, of the side packing elements 37, shown in Figs. 7 and 12. The heads of the packing plugs 16, it will be observed, are adapted to enter the enlarged circular openings 24, provided therefor in the body or core of the pistons. These two openings 24 are, after the packing plugs are in position, reduced to live steam spaces 25 which are connected with one another by means of the longitudinal opening 26. The live steam spaces 25, are each connected with the steam or expansion chamber D, by means of the openings 27, as clearly shown in Figs. 6, 7 and 8. By means of the steam pressure exerted upon the heads of the plugs 16, it will be observed, that the opposite ends of the plugs are held tightly against the inner faces of the cylinder heads B and C.

The pistons 8 and 9, it will be noticed, are cylindrical in form and provided on their periphery with the channels or cutaway portions 28 and intermediate these channels 28 the pistons are provided with the longitudinal grooves 29 in which are inserted the piston blades 30, as clearly shown in Figs. 7 and 11, which bear at their outer convex surface or face tightly against the inner concave surface of the cylinder case A. It will be observed, from Figs. 3 and 4 that these packing elements or pieces only engage the concave surface of the cylindrical case A in three-fourths of their travel, the other fourth they engage the concave surface of the channels or cutaway portions 28 of the pistons, thus preventing steam from passing centrally through the cylinder from the inlet ports to the exhaust ports. The pistons are further formed with radial grooves 31, at their ends in which are received the extended ends or legs 32, of the piston blades 30, as shown in Figs. 3 and 7. The lower ends of these legs 32 are concaved to rest and work upon the convexed upper faces 38' of the side packing pieces 37. Bow springs 33, rest in the grooves 29 of the pistons to bear against the under face 34, of the piston blade 30 serving to crowd the piston blades out tightly against the concave surface of the cylinder and channels of the pistons.

The piston blades 30 are provided at each end with a groove 35 in which are received the arms 36 of the side packing pieces 37 which are crowded outwardly and tightly against the inner faces of the heads B and C by means of the bowed springs 38. These packing pieces 37 are each formed with an enlarged head 38' having convexed upper faces 38'' to engage the lower concaved faces of the legs 32 of the packing pieces 30. The packing pieces 37 are further provided with the projections 39 which enter opening 40 in the ends of piston blades 30 to aid in holding the side packing pieces 37 in position. The piston blades 30 are capable of adjustment in case of wear as will be observed in Fig. 7. Each of the legs 32 of the piston blades 30 are provided with an opening 41 which is threaded to receive the screw 42 which has its one end smooth and pointed or cone shaped which is adapted to enter the cone shaped opening 43. By crowding the screw inward the piston blades 30 are crowded downward as is manifest.

In Fig. 14 of the drawings I have shown a modification of the invention which is a compound motor having the same parts and mechanism but instead of having but one steam or expansion chamber I employ three designated E, F and G. Chamber F, it will be noticed, is as large again as chamber E, and chamber F as large again as chamber G. Chamber E, is connected from the exhaust pipe to the top or inlet of chamber F, by means of pipe 44 and likewise chamber F with G by means of the pipe 45 the final exhaust pipe leading from chamber G and designated as 46.

It is, of course, understood that various changes in form, proportion and minor details of construction may be resorted to without departing from the principle or sacrificing any of the advantages of the invention.

Having fully described my invention, what I claim is:—

1. In a rotary steam motor, the combination with a cylinder case having a pair of intersecting cylindrical walls forming an expansion chamber at each end thereof, a piston rotatably mounted in each of said expansion chambers, said pistons each being formed with a plurality of longitudinal concaved grooves, an inlaid piston blade carried by each of said pistons intermediate each of said grooves, means for adjusting said piston blades, a cushion plug carried in each end of said pistons, an inlaid packing piece carried at each end of said piston blades, said packing pieces being each provided with a foot adapted to be carried by said cushion plugs, and means for normally holding said inlaid packing pieces in position.

2. In a rotary steam motor, the combination with a cylinder case having a pair of intersecting cylindrical walls forming an expansion chamber at each end thereof, a piston rotatably mounted in each of said expansion chambers, a plurality of concaved recesses formed in the periphery of said pistons, an inlaid piston blade carried by said pistons between each of said concaved recesses, means for adjusting said piston blades, a steam cushion plug carried within each end of each of said pistons, an inlaid side packing piece carried at each end of said piston blades, and means for normally holding said side packing pieces in position.

3. A rotary steam motor piston comprising a cylindrical head, a plurality of concaved grooves formed in the periphery of said head, a groove formed in said head intermediate each of said concaved grooves, a spring pressed piston blade carried in each of said intermediate grooves, means for adjusting said piston blades, a cylindrical cushion plug carried in each end of said piston head, and a pair of inlaid spring pressed side packing pieces carried by each of said piston blades, the lower ends of which are adapted to be carried by said cushion plugs, said cushion plugs and said piston head each being provided with a bore adapted to receive a shaft.

In testimony whereof I have signed my name to the specification in the presence of two subscribing witnesses.

HENRY R. FISHER.

Witnesses:
W. B. RYAN,
J. M. SHAFF.